United States Patent [19]

Windsor et al.

[11] Patent Number: 4,497,397

[45] Date of Patent: Feb. 5, 1985

[54] CLUTCH CONTROL SYSTEM

[75] Inventors: Harry M. Windsor, Harbury; Andrew J. Mallion, Leamington Spa, both of England

[73] Assignee: Automotive Products Limited, Leamington Spa, England

[21] Appl. No.: 350,284

[22] Filed: Feb. 19, 1982

[30] Foreign Application Priority Data

Feb. 24, 1981 [GB] United Kingdom ............... 8105845
Apr. 8, 1981 [GB] United Kingdom ............... 8111079
Nov. 8, 1981 [GB] United Kingdom ............... 8130418

[51] Int. Cl.³ .............................................. B60K 41/28
[52] U.S. Cl. .............................. 192/0.076; 192/0.052; 192/0.092
[58] Field of Search ................. 192/0.033, 0.052, 0.07, 192/0.075, 0.076, 0.092, 111 A; 303/93, 95, 100, 103

[56] References Cited

U.S. PATENT DOCUMENTS 4,023,660 5/1977 Dickinson ................. 192/0.075

FOREIGN PATENT DOCUMENTS

0038113 2/1981 European Pat. Off. .
2818427 11/1979 Fed. Rep. of Germany .
1120132 7/1968 United Kingdom .
2012892 8/1979 United Kingdom .
2080910 7/1981 United Kingdom .

Primary Examiner—George H. Krizmanich
Assistant Examiner—M. Manley
Attorney, Agent, or Firm—Kemon & Estabrook

[57] ABSTRACT

A vehicle electronic control system for a friction clutch having a clutch position signal generator which senses the vehicle operating conditions and produces a command signal which dictates the state of engagement of the clutch. A clutch actuator control is responsive to the command signal, and includes a transducer that produces a feedback signal indicative of clutch position which is fed into a comparator for comparison with the command signal. The feedback signal is modified by a signal derived from a wear compensator to alter the feedback signal as the clutch wears.

17 Claims, 8 Drawing Figures

CLUTCH CONTROL SYSTEM

This invention relates to vehicle electronic clutch control systems for the automatic control of a friction clutch situated in the drive line between a vehicle engine and a transmission.

The invention relates to electronic clutch control systems for a rotary transmission clutch having a clutch position control signal generator responsive to vehicle operating parameters and from which a command signal is derived which dictates the state of engagement of the clutch, a clutch actuator control means responsive to the command signal for operation of the clutch and including a comparator that receives the command signal and a transducer responsive to the position of the clutch to produce a feed back signal which is fed into the comparator for comparison with the command signal. Such a control system is described in our published European Patent Specification No. 0 038 113 and will be hereinafter called a clutch control system of the kind referred.

A problem associated with clutch electronic systems is that because the clutch position feedback loop utilises an actual clutch position signal derived from a transducer responsive to the position of the clutch, then the position signal is not necessarily a reflection of the true position of the clutch driven plate surfaces relative to the driving member. This is particularly true as the clutch plate wears and because of a build-up of production tolerances in the actual mechanisms of the clutch.

Accordingly there is provided a clutch control system of the kind referred characterised in that the feedback signal is modified by a signal derived from a wear compensator so that the feedback signal is altered as the clutch wears.

In a preferred system the control signal generator produces an error signal forming an input for an inverting integrator whose output forms the command signal and conveniently the wear compensator is responsive to the integrator input and output signals to produce a wear signal when the error signal approaches a given error signal value and the command signal has reached a predetermined threshold value, said wear signal being summed with the feedback signal.

In an alternative system the feedback signal can be modified by a coarse position signal produced by a coarse positional means comprising a desired clutch position reference signal generator, connected to the input of a comparator, whose other input is connected to the feedback signal and whose output is connected to an AND gate for control of a compensator signal generator for modification of the feedback signal, the trigger closing the AND gate and stopping the compensator signal when the feedback signal approaches the value of the desired position.

Conveniently the above preferred and alternative systems can be combined so that a coarse position signal is summed with the wear signal prior to the combined signal being utilised to modify the feedback signal.

The invention will be described by way of example and with reference to the accompanying drawings in which.

Figure 1:
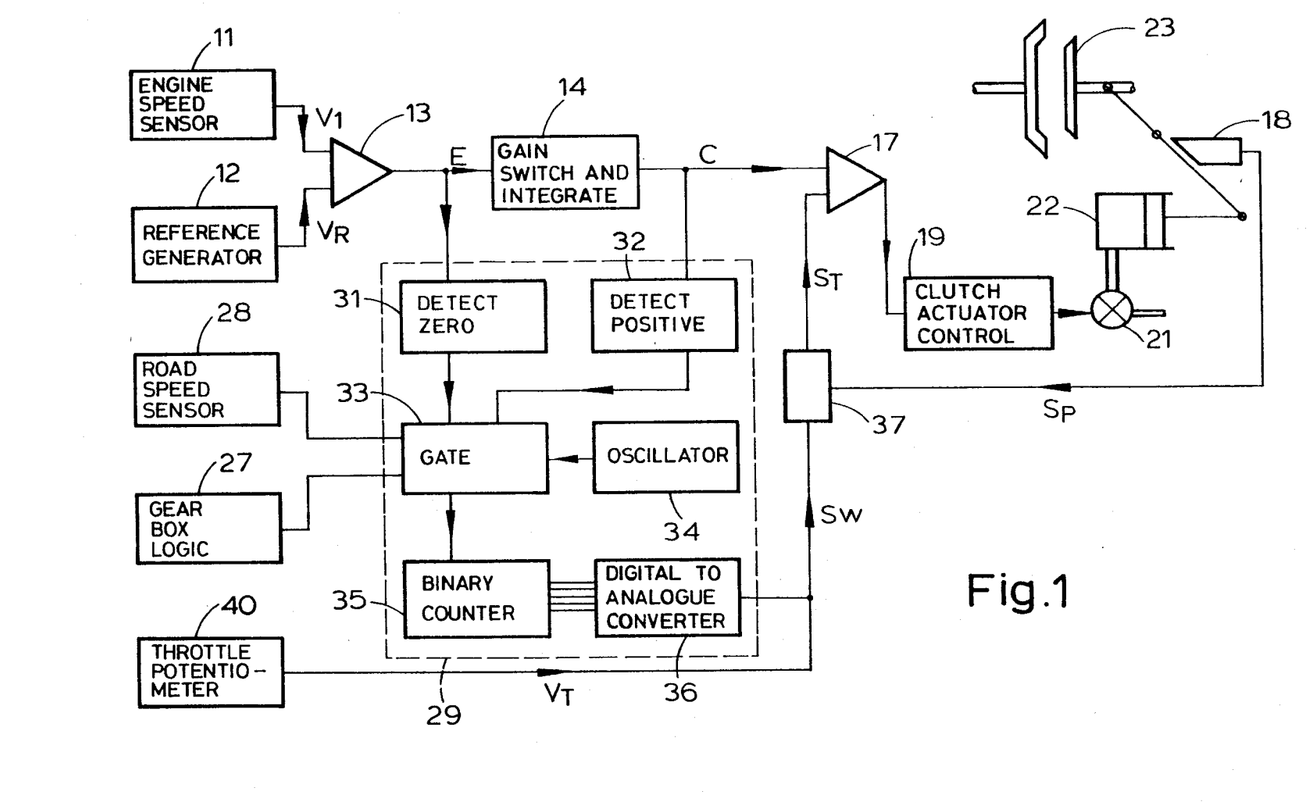
FIG. 1 is a schematic diagram of a clutch control system according to one embodiment of this invention.

The motor vehicle clutch control system illustrated in FIG. 1 includes an engine speed sensor 11 which produces a signal $V_1$ proportional to engine speed and a reference signal generator 12 that produces a reference signal $V_R$. The reference signal generator 12 produces a signal $V_R$ that can be set to be the same value as a signal obtained via engine speed sensor 11 at a particular engine speed which may be fixed at, say 1000 rpm, or may be varied depending upon engine torque demand, for example the signal may be increased to become equivalent to a higher engine speed for hill starts. This can be achieved by having a throttle potentiometer signal which is proportional to throttle opening, combined with the reference signal. As is described in our published European Specification No. 0 038 113 the throttle signal is proportional to (1-throttle opening) so that the signal decreases as the throttle opens. The throttle potentiometer signal is then inverted before combination with the reference signal $V_R$ but in this case is used in its raw state.

A comparator 13 receives the reference and engine speed signals $V_1$ and $V_R$ and measures the difference between the two signals to produce an error signal E. The error signal is positive when $V_1$ is less than $V_R$, and becomes negative when $V_1$ exceeds $V_R$. The error signal is utilised for controlling an actuator 22 that operates the clutch 23 to vary the state of engagement of the vehicle clutch 23 to alter the engine speed with subsequent variation of the engine speed signal $V_1$ to approach equivalence with the reference signal $V_R$ and make the error signal tend to zero.

The error signal E is fed into an integrator 14 which produces a command signal C which is fed into a clutch position control loop. The integrator 14 is of the type disclosed in our co-pending Application Ser. No. 279,084 and has two response modes depending upon whether a capacitor in the integrator is connected in or out of the error signal path. The integrator 14 acts in the inverting sense and a negative error signal ie. when $V_1 > V_R$, produces a positive command signal C from the integrator.

The clutch control loop comprises a comparator 17 which receives the command signal C for comparison with a signal $S_T$ which is derived from a wear compensation signal $S_W$, a clutch position feedback signal $S_P$ and a throttle position signal $V_T$. The clutch position signal $S_P$ is generated by a travel transducer 18 responsive to the position of the clutch 23 and the throttle signal $V_T$ is generated by a potentiometer 40 coupled to the butterfly valve in the carburettor. The signal from the comparator 17 is fed into a clutch actuator control 19 which includes a mark space ratio modulator utilised for controlling a solenoid valve 21.

The solenoid valve controls the hydraulic flow in a hydraulic actuator 22. The actuator 22 operates the clutch 23 and the mark space ratio of the signal fed into the valve 21 determines the flow rate through the valve and hence the velocity of the actuator 22 and therefore the state of engagement of the clutch.

The actuator 22 is operated by the control loop to equalise the two signals C and $S_T$ fed into the comparator 17, so that the state of engagement of the clutch is dictated by the size of the command signal C.

When the engine speed signal $V_1$ is greater than $V_R$ the error signal E generated at the comparator 13 and the subsequent command signal C causes the clutch 23 to engage to make $V_1$ equalise with $V_R$ and reduce the error signal to zero.

A wear compensator device 29 receives the error signal E and the command signal C. The compensation device 29 comprises a detect zero means 31 which receives the error signal E, a detect positive means 32 which receives the command signal C, and AND gate 33 which receives the signals from the two detect means 31 and 32. The AND gate also receives signals from a gearbox logic circuit 27 and a road speed sensor 28 so that the AND is open only when the logic circuit 27 has selected first gear, and the road speed is below 6 m.p.h., 6 m.p.h. corresponds with about 1500 rpm engine speed and is below the speed at which the clutch is fully engaged. The gate 33 switches in a 500 cycles/sec oscillator 34 when both the error signal is at zero and the command signal is positive. A binary counter 35 counts the number of oscillations for which the AND gate 33 is open and a digital analogue convertor 36 produces a signal $S_W$ proportional to the number of oscillations which occur whilst the gate is open.

The clutch system operates as follows:

When the vehicle is started and the engine idling the engine speed voltage $V_1$ is below the reference signal voltage $V_R$, giving rise to a positive error signal E and a negative command signal C. As the engine speed increases when $V_1$ becomes equal to $V_R$ the error signal E goes to zero and then as $V_1$ exceeds $V_R$ the error signal becomes negative. The clutch starts to engage to maintain the error signal at zero and the command signal is at that moment positive.

Without a wear compensation device 29 the clutch position is dependent upon the balance between the transducer signal $S_P$ and the command signal C and as the clutch plate wears, the control system takes a longer period of time before the engine speed is pulled down to 1000 rpm after $V_1$ exceeds $V_R$. This is because the feedback signal $S_P$ is a reflection of the clutch position. To compensate for this, the wear compensation device 29 operates as follows:

During the first clutch engagement as the clutch begins to engage, then at that instant with the vehicle in first gear and travelling at less than 6 m.p.h. both the command signal C is positive, because $V_1$ has overshot $V_R$, and the error signal E is approaching zero. The gate 33 then switches in the oscillator 34 and the counter and converter and a signal $S_W$ is generated, which is equivalent to the time for which the oscillator 34 is switched on by the gate. For a new clutch plate this oscillator count will be minimal. Once the clutch is engaged sufficiently to maintain engine speed at 1000 rpm, the command signal C goes to zero and the gate 33 switches off.

The counter 35 counts the number of oscillations for which the gate 33 was open and the digital-to-analogue converter 36 produces a constantly generated output signal $S_W$ of amplitude proportional to the count, which is combined in a junction 37 with the clutch position signal $S_P$ to reduce $S_P$ to the signal $S_T$. This was the effect of causing the integrator command signal C to be reduced by a slight further engagement of the clutch so as to make C equal with the signal $S_T$.

Figure 2:
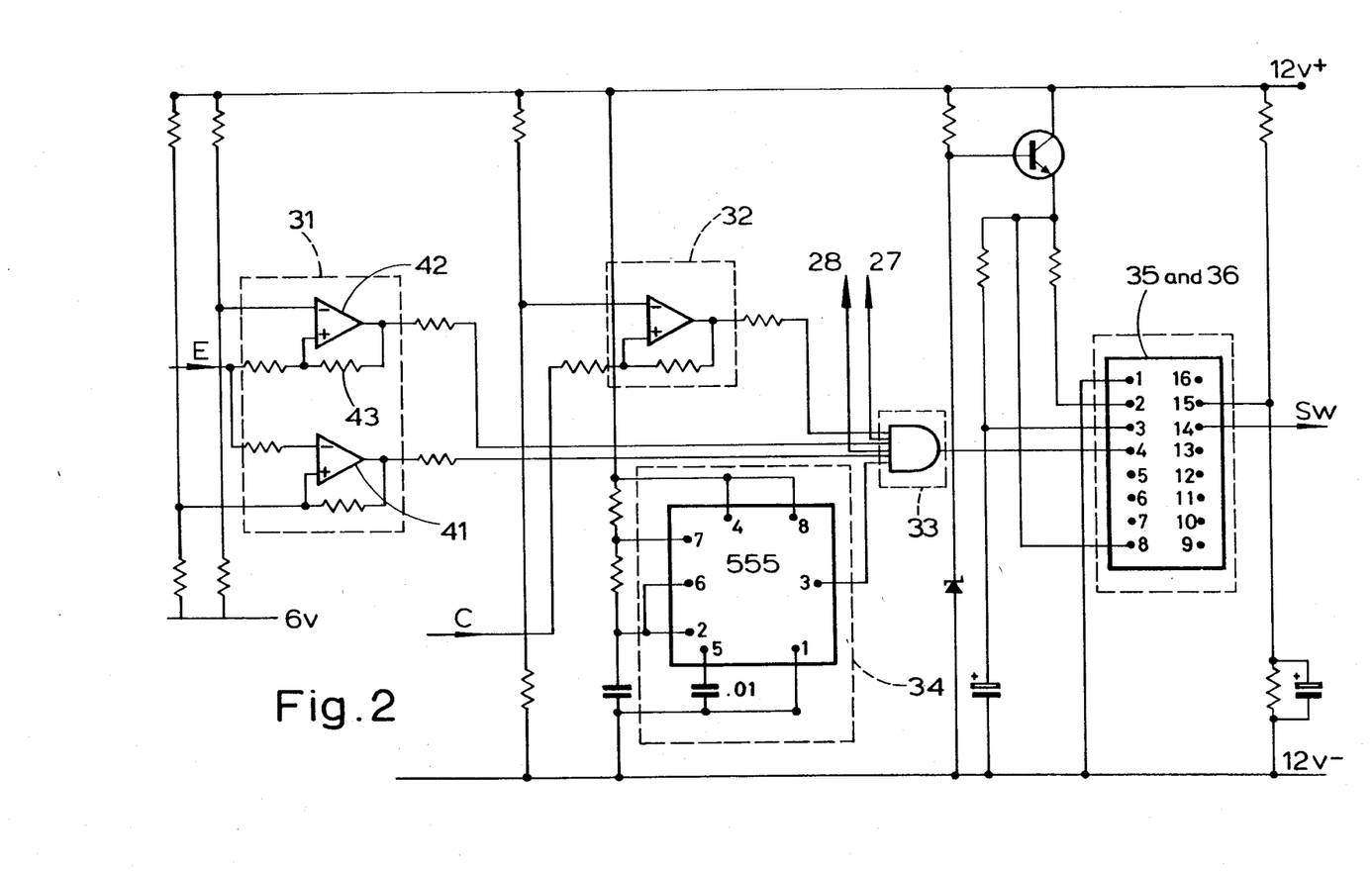
FIG. 2 is a detailed circuit of the wear compensator utilised in FIG. 1.

As the clutch plate wear subsequently takes place then sp will increase to $S_p + dS_p$ and the oscillator count will increase and the converter will produce a new signal $S_W + dS_W$ equivalent to the increased count and the total signal $S_T$ will remain constant. The apparatus is arranged to be switched on and off with the vehicle ignition system so that it is reset at every journey. However, the apparatus could be wired across the vehicle battery so that it is set on the first engagement of a new clutch plate and remains in the system until a new plate is fitted. The detail of the circuit of the wear compensating device is shown in FIG. 2.

Figure 3:
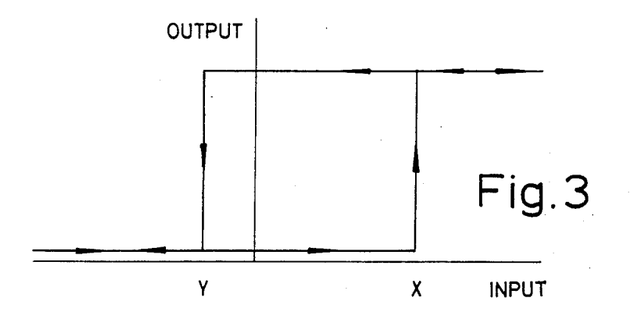
FIG. 3 is a graph of input versus output for amplifier 42 in FIG. 2.

The zero detect 31 comprises two amplifiers 41 and 42 one of which 41 is an inverting amplifier. The amplifier 42 operates (see FIG. 3) so that the input switches the amplifier to produce an output at say X volts but does not switch off against until the input falls to y volts. The hysteresis effect is determined by the size of the resistor 43 across the amplifier.

Figure 4:
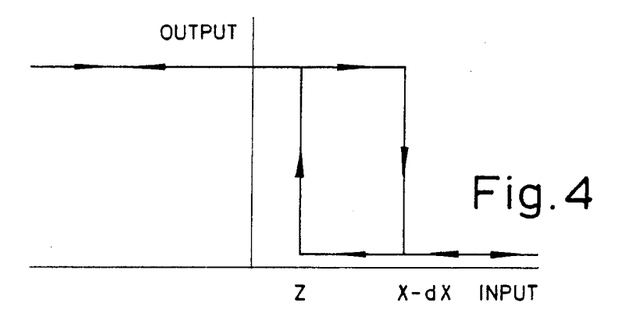
FIG. 4 is a graph of input versus output for amplifier 41 of FIG. 2.

The amplifier 41 is an inverting amplifier in which the output is switched off when the input reaches x-dx volts and switches back on when input drops back to z volts. (z is greater than y) (see FIG. 4). The hysteresis again being determined by the size of the resistor across the amplifier.

Figure 5:
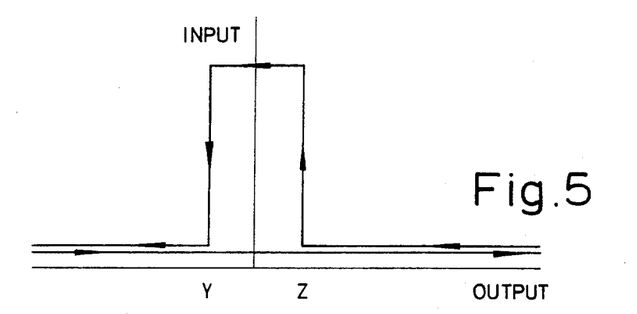
FIG. 5 is a graph of input versus output for the zero detect means 31 of FIG. 2.

When the AND gate 33 executes an AND operation on the outputs from the two amplifiers 41 and 42 (see FIG. 5) then the AND gate will only switch a signal through for the period when both output signals from 41 and 42 have a high value. This causes a response window for an input between y volts and z volts when the input is falling so that wear detector is only switched on when the error signal is approaching zero as the clutch is engaging.

Now if the clutch take-up takes place at full throttle then the clutch plate will be in hard engagement with the driving members and the feedback signal $S_P$ will be greater than normal, say $S_P + dS_P$ and therefore $S_T$ will be larger than it should be. In order to compensate for this the throttle signal $V_T$ which is reducing with increasing throttle opening, is combined with $S_W$.

At above 6 m.p.h. the AND gate closes and the wear compensator 29 is switched off. This ensures that the device does not function at every gear change and also by having the limit of 6 m.p.h., which is below the engine rpm at which the clutch is fully engaged, it is possible to ensure that the signal $S_W$ is related to the position at which the clutch is in slipping engagement with the driving surfaces.

Figure 6:
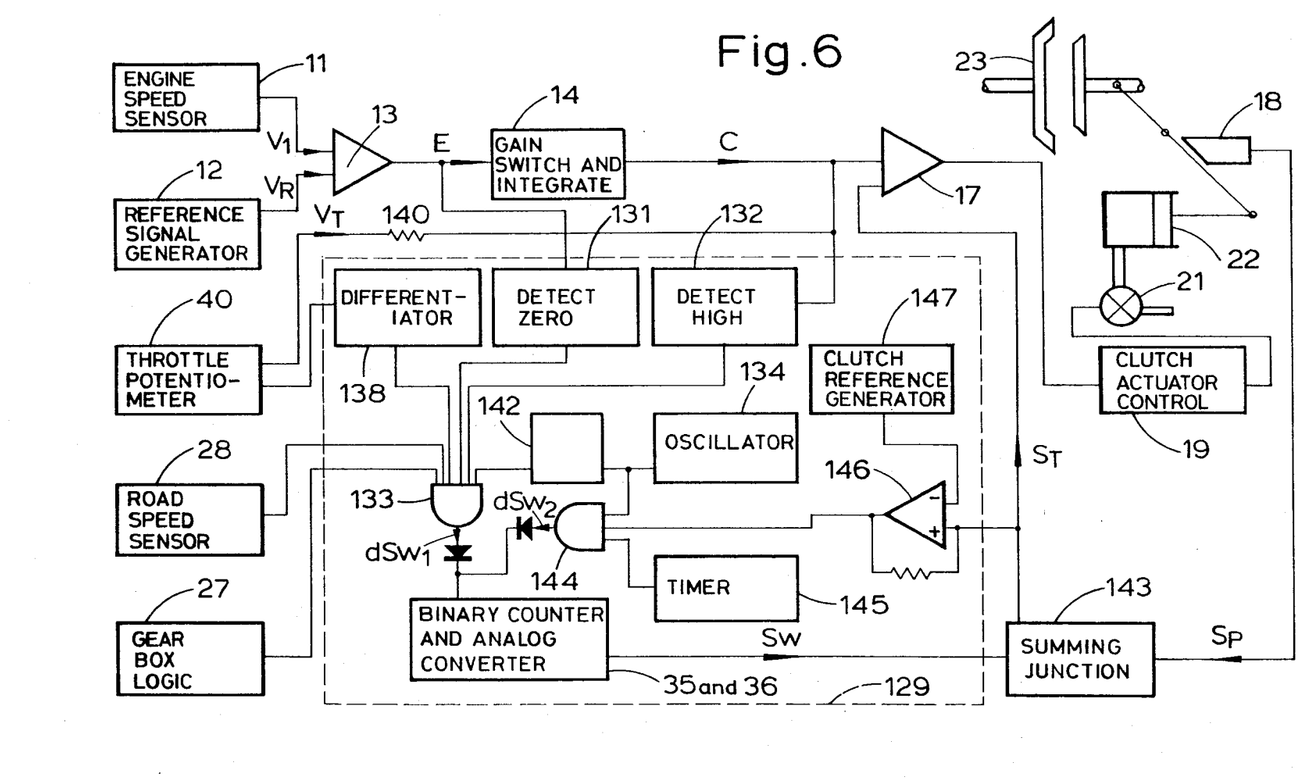
FIG. 6 is a schematic diagram of a second clutch control system according to an alternative embodiment of this invention.
Figure 7:
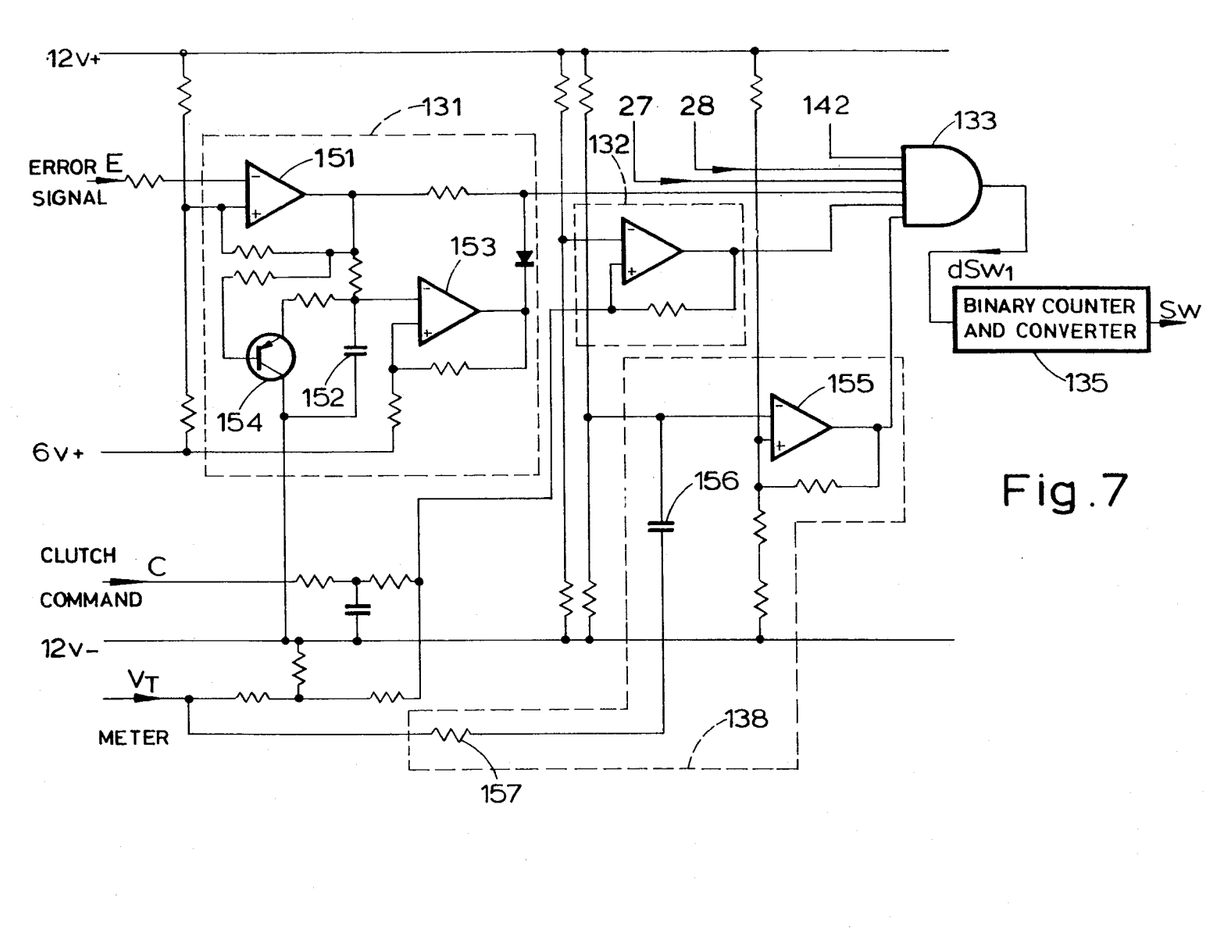
FIG. 7 is a portion of the detailed circuit showing in particular the error signal valve detect means, the command signal threshold valve detect means, and the throttle position differentiator.
Figure 8:
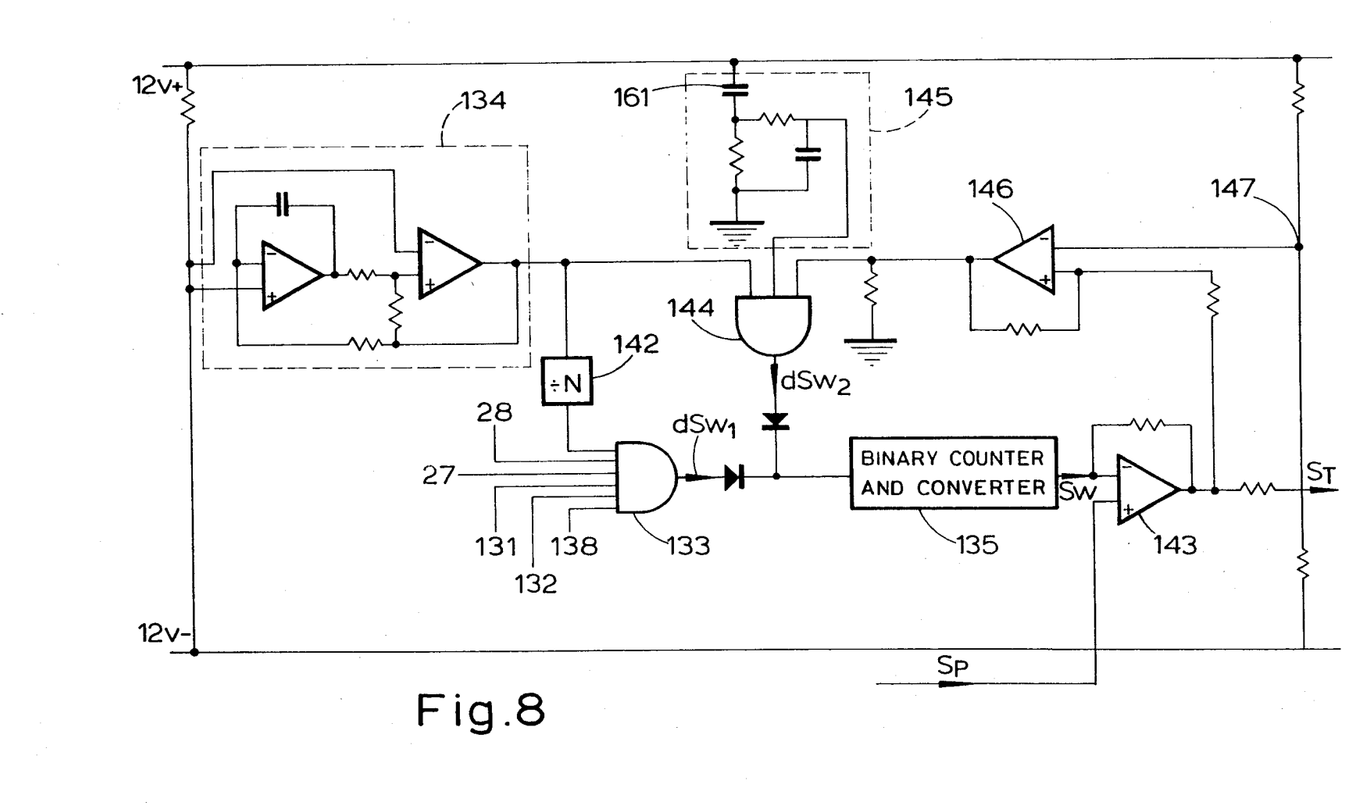
FIG. 8 is a further portion of the detailed circuit showing in particular the oscillator, AND gate, comparator and the coarse positional means.

A second embodiment of the invention is shown in FIGS. 6–8, in which those components common with the system as previously described with reference to FIG. 1 will be given the same reference numerals.

The system shown in FIGS. 6 to 8 operates as previously described.

The comparator 13 receives the reference and engine speed signals $V_1$ and $V_R$ and measures the difference between the two signals to produce the error signal E. When $V_1$ is less than $V_R$ the error signal is greater than zero, when $V_1 = V_R$ the error signal is zero, and when $V_1$ exceeds $V_R$ the error signal is less than zero.

When the engine speed signal $V_1$ is greater than $V_R$ the error signal E generated at the comparator 13 and the subsequent command signal C causes the clutch 23 to engage to make $V_1$ equalise with $V_R$ and make the error signal tend to zero.

A wear compensator device 129 receives the error signal E and the command signal C. The compensation device 129 comprises a detect means 131 which detects when the error signal is zero or just less, a detect high means 132 which receives the command signal C, and an AND gate 133 which receives the signals from the two means 131 and 132. The AND gate 133 also receives signals from the gearbox logic circuit 27 and the road speed detector 28 so that the AND is open only when the logic circuit 27 has selected first gear, and the road speed is below 6 m.p.h. The gate 133 also receives a signal from a throttle position differentiator 138 which is connected to the potentiometer 40 coupled to the butterfly valve in the vehicle carburettor. In this system the throttle potentiometer 40 is not, as previously, connected to the feedback signal $S_P$ but is connected via a resistor 140 to the command signal take-off for the detect HIGH 132.

The gate 133 switches in a signal derived from a 1000 cycles/sec oscillator 134 when the error signal approaches zero and the command signal C is high, and all the other command signals are correct. The 1000 cycles/sec signal from the oscillator 134 is fed through a divider 142 which reduces the signal to 100 cycles/sec. A binary counter and analogue converter 35 counts the number of oscillations for which the AND gate 133 is open and produces a signal $dSW_1$ proportional to the number of oscillations for which the gate is open. This is the fine adjustment for the compensator. The signal $dSW_1$ is combined with a signal $dSW_2$ from a second AND gate 144 and is subsequently combined with the feedback signal $S_P$ from the clutch position transducer 18 at a summing junction 143, to form the signal ST which is fed into the comparator 17.

The signal from the oscillator 134 is also fed into the second AND gate 144 which also receives a signal from a timer 145, and a comparator 146. The comparator 146 has its inputs connected to a reference voltage generator 147 and to the signal $S_T$. The AND gate 144 is open whilst the timer 145 passes a signal thereto (approx. 0.35 secs.) and the comparator 146 is open. The comparator closes when the signal $S_T$ approaches the preset signal from the reference generator 147. This is the coarse positional adjustment means for the compensator 129.

Detailed circuits of the oscillator 134 and timer 145 are shown in FIG. 8. This circuit takes up any engineering tolerances in the clutch actuation mechanism. When the clutch position potentiometer 18 is assembled in place onto the vehicle gearbox (not shown) the mechanical tolerances will cause the potentiometer to have a tolerance on its feedback signal $S_P$ with resepct to clutch position. When the potentiometer is fitted to a new clutch, it is set with the clutch release bearing just touching the clutch diaphragm spring fingers (or release levers, as the case may be). The clutch position reference generator 147 is set to a predetermined voltage above zero to ensure that the circuit is set for a condition when the clutch is fully engaged. When the vehicle ignition is switched on the circuit will count rapidly to produce a signal that will result in $S_T$ being equal to the predetermined voltage so that as the clutch plate wears $S_T$ is maintained at said voltage which corresponds to the clutch fully engaged condition.

When the vehicle ignition is switched on the timer 145 will hold the gate 144 open until its capacitor 161 charges and closes the gate 144. Whilst the gate 144 is open the oscillator 134 is feeding at 1000 cycles per second directly into the counter 135 to produce a signal $dSW_2$ until such times as the comparator 146 shuts off the gate 144. The timer 145 is arranged to remain open for a longer time period than will be required for the comparator 146 to operate. Thereafter every time the driver operates his ignition switch this circuit will produce an initial signal $dSW_2$ which will slowly alter as the clutch plate wears. The signal $dSW_2$ will ensure that the clutch plate is roughly in the correct position for maintaining a constant engine speed at clutch engagement and the signal $dSW_1$ will give a final adjustment to the clutch position.

In some instances it is possible for the clutch wear to be compensated for by means of the coarse positional adjustment means only.

The detect means 131 is shown in detail in FIG. 7 and comprises a threshold detector 151 which receives the error signal E and compares it with a fixed reference voltage which is just above zero. When the threshold detector 151 is triggered by the error signal approaching zero or going below zero, its output signal goes high and opens the AND gate 133 provided that all its other input conditions are met. When the detector 151 output goes high, it charges up capacitor 152 causing the input to a second threshold detector 153 to increase. The second detector 153 is an inverting amplifier and its normally higher output goes low when the amplifier 153 is triggered. The output from the second threshold detector 153 then pulls down the high output from the first detector 151 and closes the gate 133. The time lapse period for the capacitor 153 to charge up, and for which both detector outputs are high is approx. 1 second. If the error signal E suddenly goes high ie. the engine speed signal $V_1$ drops below the reference voltage $V_R$, the detector 151 will switch low shutting off the gate 133. This will cause a transistor 154 to allow the capacitor 152 to discharge immediately so that if the error signal subsequently goes low, the capacitor 152 will require the full time lapse to charge.

The detect HIGH 132 comprises a threshold detector connected to a reference voltage ($\simeq$ zero) and a combined signal which is summed from the throttle potentiometer signal $V_T$ and the clutch command signal C. The reference voltage is chosen to be always less than the combined command and throttle signal above 1000 rpm. When the command signal C goes high the threshold detector 132 is triggered and its output opens the gate 133 provided all its other input conditions are met.

The throttle differentiator 138 comprises an inverted threshold detector 155 whose output is connected to the gate 133. The detector 155 output is normally high to keep the gate 133 open but when triggered goes low closing the gate. The positive input to the detector 155 is connected to a reference voltage ($\simeq$ zero) and the negative input is connected to the throttle potentiometer 41 via a capacitor 156 and resistor 157. During acceleration whilst the output from the throttle potentiometer is decreasing the capacitor 156 effectively prevents triggering of the threshold detector 155. If the accelerator is suddenly released the throttle signal goes up and the capacitor 156 discharges a high signal input to the detector 155 causing it to trigger and its output to go low, thereby momentarily closing the gate. This has the effect of preventing the wear compensator from counting during those moments when the engine speed exceeds the reference due to inertia of the engine when the throttle is closed.

Also if the clutch take-up occurs at a high throttle opening the clutch plate engages fully with the driving member and the signal $S_P$ is greater than it should be eg. $S_P+dS_P$ and therefore the wear compensator 129 will operate and $S_W$ will be larger than should be. In order to prevent this, the throttle signal from the potentiometer 40 is combined with the command signal take-off for the detect high means 132. Since the throttle signal is decreasing with throttle opening, and the command signal goes high as the engine speed signal $V_1$ increases above $V_R$, then the combined signal remains substantially constant and switches off the gate 133 at a lower level of wear signal.

The clutch system operates as follows:

When the vehicle is started and the engine idling the engine speed voltage $V_1$ is below the reference signal voltage $V_R$, giving rise to a high error signal E and a low command signal C. As the engine speed increases $V_1$ becomes equal to $V_R$ the error signal E goes to zero and then as $V_1$ exceeds $V_R$ the error signal goes low. The clutch starts to engage to maintain the error signal zero and the command signal C is at that moment high.

When the ignition is first switched on the wear device produces an initial signal $dSW_2$ as previously described. During the first clutch engagement as the clutch begins to engage, then at that instant with the vehicle in first gear and travelling at less than 6 m.p.h., both the command signal C is high, because $V_1$ has overshot $V_R$, and the error signal E is approaching zero Providing the trigger 155 in the differentiator 138 has not been triggered the gate 33 then switches in the oscillator 134 for a time period until either of the signals E or C changes to close the gates 133. The oscillator count through the gate 133 produces a signal $dSW_1$ which is combined with the signal $dSW_2$ to form the wear signal SW. For a new clutch plate this oscillator count for $dSW_1$ will be minimal. Once the clutch is engaged sufficiently to maintain $V_1=V_R$ command signal C goes to zero and the gate 133 switches off.

The counter and converter 35 counts the number of oscillations for which both the gates 133 and 144 were open and produces a fixed output signal $S_W$ which is proportional to the count, which is then combined in a summing junction 143 with the clutch position feedback signal $S_P$ to form the signal $S_T$. This has the effect of allowing a slight further engagement of the clutch for a given engine speed signal $V_1$, thereby holding the engine speed at which the clutch engages substantially constant, even though wear to the clutch plate is taking place.

As wear subsequently takes place the oscillator count through the gate 133 will increase and produce an increased signal $dSW_1$ and thereby increase $S_W$.

We claim:

1. A vehicle electronic control system for a rotary transmission clutch and which includes:
 a reference signal generator;
 a clutch position signal generator means which is response to vehicle operating parameters, means for deviving an error signal from an output of the reference signal generator and an ouput of the clutch position signal generator and;
 an inverting integrator which receives the error signal and the output of which forms a command signal which dictates the state of engagement of the clutch;
 a clutch actuator for operation of the clutch;
 a clutch actuator control means responsive to the command signal and which controls the operation of the actuator and which includes a comparator responsive to the command signal and a transducer responsive to the position of the clutch and which produces a feedback signal which is fed into the comparator for comparison with the command signal; and
 a wear compensator means that modifies the feedback signal to alter said feedback signal as the clutch wears, the wear compensator means comprising a first detect means connected to the integrator input for sensing a given error signal voltage and which produces an output signal for control of a first AND gate, a second detect means connected to the integrator output for sensing when the command signal has passed a threshold value and which also produces an output signal for command of the first AND gate, and a wear signal generator means controlled by the first AND gate for producing a wear signal, said wear signal being summed with the feedback signal.

2. A system as claimed in claim 1, wherein the wear compensator means comprises a coarse positional means comprising a desired clutch position reference signal generator; a further comparator having an input connected to said desired position signal generator and another input connected to the feedback signal and a further AND gate connected to the output of the further comparator; and a compensator signal generator providing a compensator signal and controlled by the further AND gate and connected to the feedback signal, wherein the comparator closes the AND gate and stops the compensator signal when the value of the feedback signal approaches the value of the desired position signal.

3. A system as claimed in claim 2, wherein the further AND gate is also controlled by a timer such that said further AND gate is openable only for a limited period after switching on the vehicle ignition.

4. A system as claimed in claim 1, wherein the second detect means is an amplifier connected between the command signal and the AND gate, and is triggered to open the AND gate by the command signal voltage reaching or passing its predetermined threshold value.

5. A system as claimed in claim 4, wherein the wear signal generator means comprises an oscillator that is switched on and off by the AND gate, a binary counter that counts the number of oscillations for which the AND gate is open, and a digital analogue converter that produces a wear signal comensurate with the number of counts.

6. A system as claimed in claim 1, wherein the first detect means comprises two amplifiers connected in parallel between the error signal and the AND gate, said amplifiers each being connected to the error signal by a different polarity input and being triggered at different voltages so as to create a narrow signal band about a zero error signal, for which the AND gate is open, thereby opening the AND gate only within said band.

7. A system as claimed in claim 1, wherein a throttle position sensor produces a throttle signal indicative of the vehicle throttle opening, and said throttle signal is combined with the wear signal so as to further reduce the feedback signal when the clutch is engaged at full throttle.

8. A system as claimed in claim 1, wherein a gearbox logic circuit produces a signal when the logic circuit has selected first gear and the AND gate receives said logic signal so that the AND gate is only open when the gearbox logic has selected first gear.

9. A system as claimed in claim 1, wherein a road speed sensor produces a signal indicative of road speed and the AND gate receives the speed signal so that the AND gate is only open upto a predetermined road speed.

10. A system as claimed in claim 4, wherein the first detect means comprises a first threshold detector whose output goes high when the error signal falls to or below a predetermined value.

11. A system as claimed in claim 10, wherein the first threshold detector has an automatic switch off device which makes its output go low after a predetermined lapsed time period.

12. A system as claimed in claim 11, wherein the switch off device comprises: a capacitor connected to the output of the first detector, and a second threshold detector whose input is connected to said output and which acts in the inverting sense so that its output goes low when the capacitor is fully charged, and the output of the second threshold detector is also connected to the output of the first detector so as to pull the first detector output low, when the second threshold detector output is low.

13. A system as claimed in claim 12, wherein a switch means is connected to the capacitor and automatically responds so that said capacitor discharges when the first threshold detector output goes low.

14. A system as claimed in claim 13, wherein the switch means is a transistor.

15. A system as claimed in claim 1, wherein a throttle position sensor produces a throttle signal indicative of throttle opening and said signal is combined with the command signal take off for the second detect means so as to modify the input signal thereto.

16. A system as claimed in claim 15, wherein a differentiator means is interposed between the throttle position sensor and the AND gate so that sudden decreases in throttle opening close the AND gate.

17. A system as claimed in claim 1, wherein the wear compensator means also includes a coarse positional means comprising a desired clutch position reference signal generator; a further comparator having an input connected to said desired positioner signal generator and another input connected to the feedback signal and a further AND gate connected to the output of the further comparator; and a compensator signal generator providing a compensator signal and controlled by the further AND gate and connected to the feedback signal, wherein the comparator closes the further AND gate and stops the compensator signal when the value of the feedback signal approaches the value of the desired position signal, and said coarse position signal is summed with the wear signal prior to the combined signal being utilized to modify the feedback signal.

* * * * *